(12) United States Patent
Chang

(10) Patent No.: US 11,066,977 B1
(45) Date of Patent: Jul. 20, 2021

(54) IGNITOR FOR NATURAL GAS ENGINE

(71) Applicant: Caterpillar Inc., Peoria, IL (US)

(72) Inventor: David Y. Chang, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/749,642

(22) Filed: Jan. 22, 2020

(51) Int. Cl.
| | | |
|---|---|---|
| *F02B 19/00* | (2006.01) | |
| *F02B 1/12* | (2006.01) | |
| *F02M 26/01* | (2016.01) | |
| *F02D 37/02* | (2006.01) | |
| *F02B 3/06* | (2006.01) | |
| *F02D 41/38* | (2006.01) | |
| *F02B 75/12* | (2006.01) | |
| *F02D 41/00* | (2006.01) | |
| *F02D 13/02* | (2006.01) | |

(52) U.S. Cl.
CPC ............... *F02B 1/12* (2013.01); *F02M 26/01* (2016.02); *F02B 3/06* (2013.01); *F02B 2075/125* (2013.01); *F02B 2275/14* (2013.01); *F02D 13/0215* (2013.01); *F02D 37/02* (2013.01); *F02D 2041/001* (2013.01); *F02D 2041/389* (2013.01)

(58) Field of Classification Search
CPC .......... F02B 19/00; F02B 23/04; F02B 19/12; F02B 19/18; F02B 27/0242; F02B 823/08
USPC .................................. 123/253, 260, 286, 287
See application file for complete search history.

(56) References Cited

U.S. PATENT DOCUMENTS

| | | | | |
|---|---|---|---|---|
| 9,970,421 B2* | 5/2018 | Coldren | .................... | F04B 1/12 |
| 2014/0366527 A1* | 12/2014 | Fletcher | ................. | F02B 37/12 |
| | | | | 60/600 |
| 2014/0369806 A1* | 12/2014 | Fletcher | ............. | F02D 41/0007 |
| | | | | 415/1 |
| 2015/0376863 A1* | 12/2015 | Ziegenmeyer | ........ | E02F 3/7645 |
| | | | | 280/446.1 |

FOREIGN PATENT DOCUMENTS

| | | |
|---|---|---|
| JP | 3695019 B2 | 9/2005 |
| JP | 2010-203428 A | 9/2009 |
| JP | 4341166 B2 | 10/2009 |

* cited by examiner

*Primary Examiner* — John Kwon
(74) *Attorney, Agent, or Firm* — Bookoff McAndrews

(57) ABSTRACT

In one aspect, an engine ignition apparatus for a natural gas engine may include a housing including a drive piston, a floating piston, a controllable hydraulic fluid chamber located between the drive piston and the floating piston, and an ignition chamber acted on by the floating piston, the ignition chamber having an outlet formed by a plurality of orifices, the outlet being in direct communication with a combustion chamber of the engine. In another aspect, an engine ignition apparatus for a natural gas engine may include, among other features, a controllable valve connected to a hydraulic fluid chamber, and configured to open and release a hydraulic fluid from the hydraulic fluid chamber, and to close. In still another aspect, a method for controlling an engine ignition apparatus for an engine includes, among other features, controlling a volume of a hydraulic fluid chamber of an ignition apparatus.

14 Claims, 4 Drawing Sheets

IGNITOR FOR NATURAL GAS ENGINE

TECHNICAL FIELD

The present disclosure relates generally to a natural gas engine and, more particularly, to an ignitor for a natural gas engine.

BACKGROUND

Natural gas engines require a device for igniting a compressed air-fuel mixture in a combustion chamber of the natural gas engine. As an example of such a device, a spark plug may be used, which delivers electric current from an ignition system to the combustion chamber of the natural gas engine to ignite the compressed air-fuel mixture by providing an electric spark. Spark plugs have a limited use life of about 2000 hours, and, therefore, require frequent replacement. In addition, as a result of the need to frequently replace spark plugs, natural gas engines including spark plugs have higher operations costs and longer operation down time.

As an example of an engine that uses an ignition device other than a spark plug, Japanese Patent No 3695019 ("the '019 patent") describes a gas engine that varies a volume of a prechamber during a working state of an engine. More specifically, the '019 patent describes a gas engine including a main chamber formed on a cylinder side, and a prechamber arranged at a cylinder head, the main chamber and the prechamber being intercommunicated through a communication port. A control valve releases the communication port during a compression stroke, and closes the communication port during a suction stroke. A fuel feed valve releases a fuel feed port to feed gas fuel to the prechamber during a closing period of the communication port by the control valve. In addition, a prechamber piston is arranged in the prechamber so as to vary the volume of the prechamber. Further, a controller effects control through which the prechamber piston is operated by a hydraulic device in response to a working state of the engine, and the volume of the prechamber is changed.

The arrangement of the fuel feed valve and fuel feed port relative to the prechamber of the gas engine of the '019 patent requires an opening in the prechamber to allow for injection of gas fuel to the prechamber during a closing period of the communication port by the control valve. Further, the operation of the control valve requires control that accounts for timing of at least the compression stroke and the suction stroke a cycle of an engine.

The present disclosure is directed to addressing one or more problems of the system of the '019 patent, and/or other problems in the art.

SUMMARY

In one aspect, an engine ignition apparatus for a natural gas engine may include a housing including a drive piston, a floating piston, a controllable hydraulic fluid chamber located between the drive piston and the floating piston, and an ignition chamber acted on by the floating piston, the ignition chamber having an outlet formed by a plurality of orifices, the outlet being in direct communication with a combustion chamber of the engine.

In another aspect, an engine ignition apparatus for a natural gas engine may include a housing including a drive piston, a floating piston, a controllable hydraulic fluid chamber located between the drive piston and the floating piston, a controllable valve connected to the hydraulic fluid chamber, and configured to open and release a hydraulic fluid from the hydraulic fluid chamber, and to close, and an ignition chamber acted on by the floating piston, the ignition chamber having an and outlet.

In still another aspect, a method for controlling an engine ignition apparatus for an engine may include driving a drive piston to move a floating piston, controlling a volume of a hydraulic fluid chamber of the ignition apparatus between the drive piston and the floating piston, compressing an air-fuel mixture in an ignition chamber of the ignition apparatus by movement of the floating piston, the air-fuel mixture being configured to ignite when compressed to a threshold pressure, and directly communicating the ignition chamber with a combustion chamber through an outlet of the ignition chamber.

BRIEF DESCRIPTION OF THE DRAWINGS

The accompanying drawings, which are incorporated in and constitute a part of this specification, illustrate various embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. In addition, As used herein, natural gas may include any gaseous fuel, including, but not limited to, propane gas, methane gas, or any other fuel in gaseous form suitable for combustion in an internal combustion engine.

Figure 1:
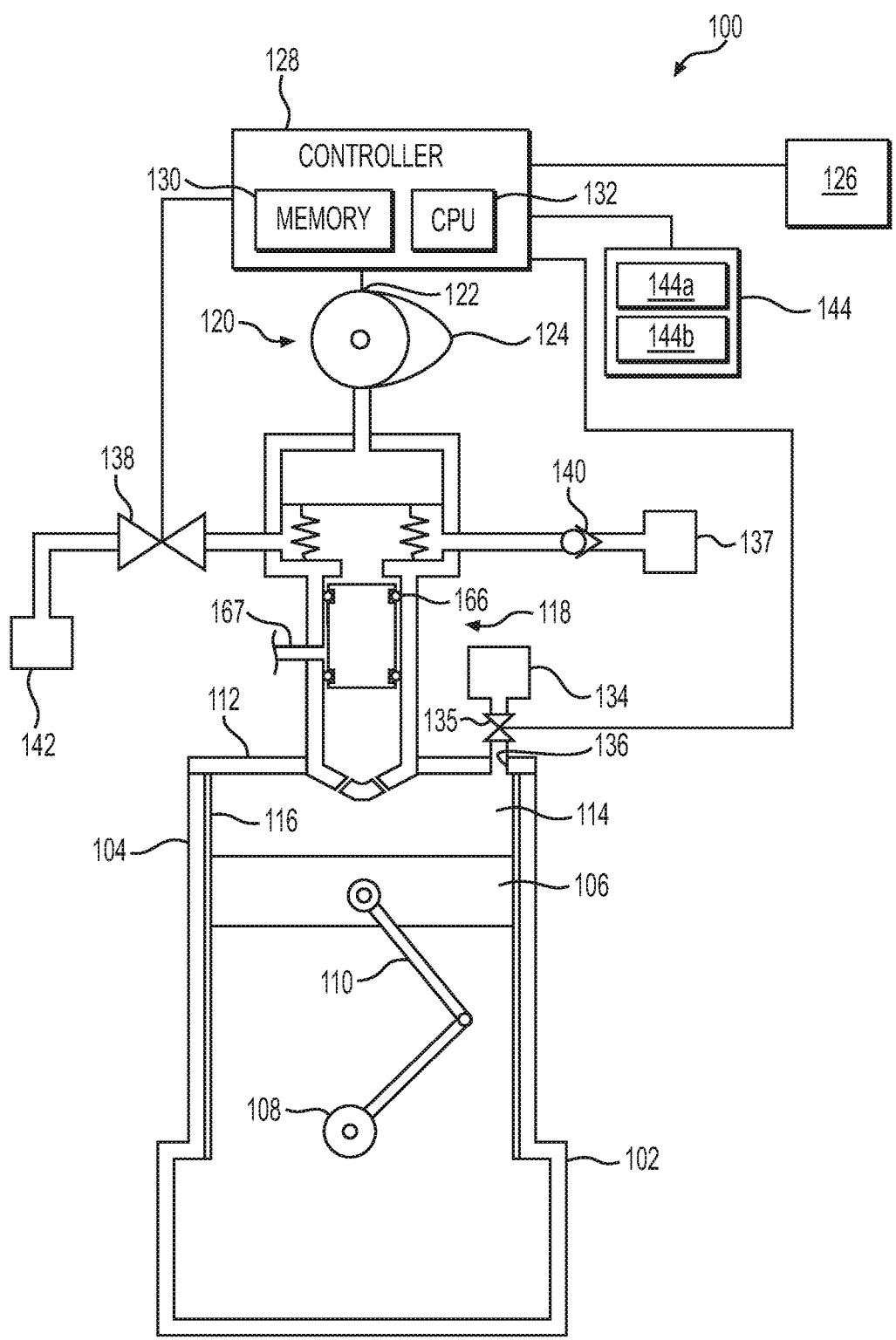
FIG. 1 is a schematic diagram of a natural gas engine, in accordance with the present disclosure.

As shown in FIG. 1, a natural gas engine 100 includes an engine block 102 having one or more cylinders 104, each including an engine piston 106 that reciprocates within the cylinder 104 between a top-dead-center (TDC) position and a bottom-dead-center (BDC) position, a crankshaft 108 connected to the engine piston by a connecting rod 110, and a cylinder head 112. Each arrangement of the cylinder 104, the engine piston 106, and the cylinder head 112 define a combustion chamber 114 of the natural gas engine 100. In addition, each cylinder 104 may be provided with an engine liner 116. Although the engine 100 may include more than one cylinders 104, (e.g. two to sixteen cylinders), for simplicity, the description below refers to one engine cylinder 104, and features and aspects of the one cylinder 104 described below may apply to all cylinders 104 of the engine 100.

The natural gas engine 100 also includes an ignition apparatus 118 connected to the cylinder head 112, and a cam drive 120 having a cam 122 with a lobe 124. The cam drive 120 is also connected to the crankshaft 108. In addition, the natural gas engine 100 includes a power source 126, such as a battery or a generator, and a controller 128. The controller 128 may include at least one memory 130 that stores a set of instructions, and at least one processor 132, such as a central processing unit (CPU), configured to read and to execute instructions of the stored set of instructions.

The natural gas engine 100 also includes an air-fuel mixture supply 134 that is connected to the cylinder 104 to supply an air-fuel mixture to the combustion chamber 114. An intake valve 135 is provided adjacent to an air-fuel inlet 136 of the cylinder head 112. Opening and closing of the intake valve 135 is controlled by the controller 128. Further, the natural gas engine 100 includes a hydraulic fluid supply 137 and an electronically controlled valve 138 that are connected to the ignition apparatus 118. A one-way inlet check valve 140 is provided between the hydraulic fluid supply 137 and the ignition apparatus 118, and controls supply of the hydraulic fluid to the ignition apparatus 118. The one-way check valve 140 is normally closed, and opens as a result of a pressure differential across the valve 140. The electronically controlled valve 138 outputs the hydraulic fluid to a hydraulic fluid container 142, such as an oil pan or other reservoir. Opening and closing of the electronically controlled valve 138 is also controlled by the controller 128. The natural gas engine 100 may also include one or more sensors 144, such as an exhaust gas temperature sensor 144a that measures a temperature of the exhaust gas output from the engine 100, and/or an intake manifold air temperature (IMAT) sensor 144b that measures a temperature of air passing through an intake manifold (not shown) of the engine 100. The sensors 144 are connected to the controller 128 to provide sensor measurements to be used by the controller 128 in executing programs for control of the engine 100.

Figure 2:
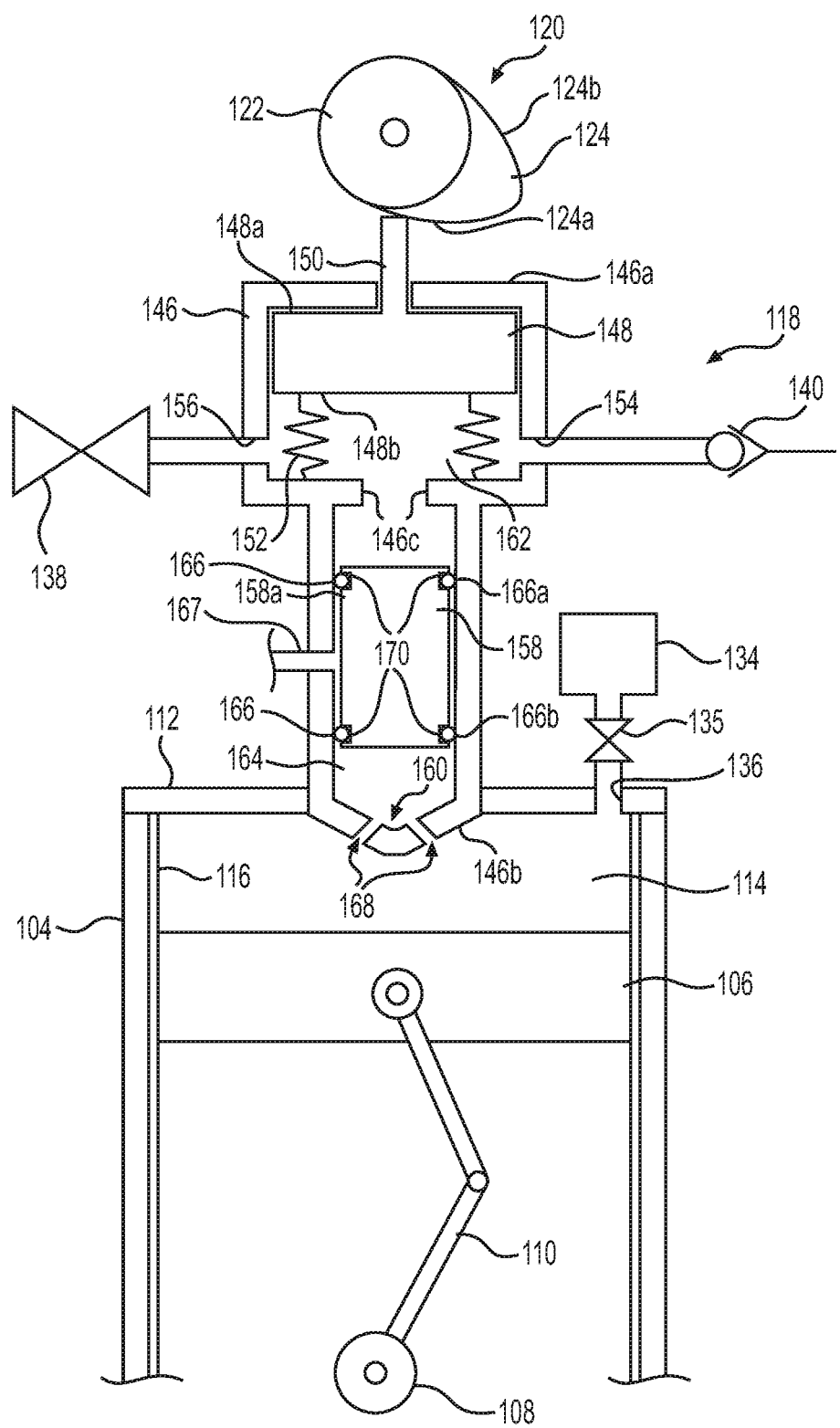
FIG. 2 is a schematic diagram of an ignition apparatus for a natural gas engine, in accordance with the present disclosure.

As shown in FIG. 2, the ignition system 118 includes a housing 146 with a drive piston 148 having a pushrod 150 extending from an upper surface 148a of the drive piston 148 and through an upper surface 146a of the housing 146, and at least one spring 152 connected to a bottom surface 148b of the drive piston 148. The housing 146 also includes a protruding circumferential rim 146c, a hydraulic fluid inlet 154 connected to the hydraulic fluid supply 137, and a hydraulic fluid outlet 156 connected to the electronically controlled valve 138. Further, the housing 146 includes a floating piston 158 and an outlet 160. A hydraulic fluid chamber 162 is located between the drive piston 148 and the floating piston 158, and an ignition chamber 164 is located between the floating piston 158 and the outlet 160.

Figure 3:
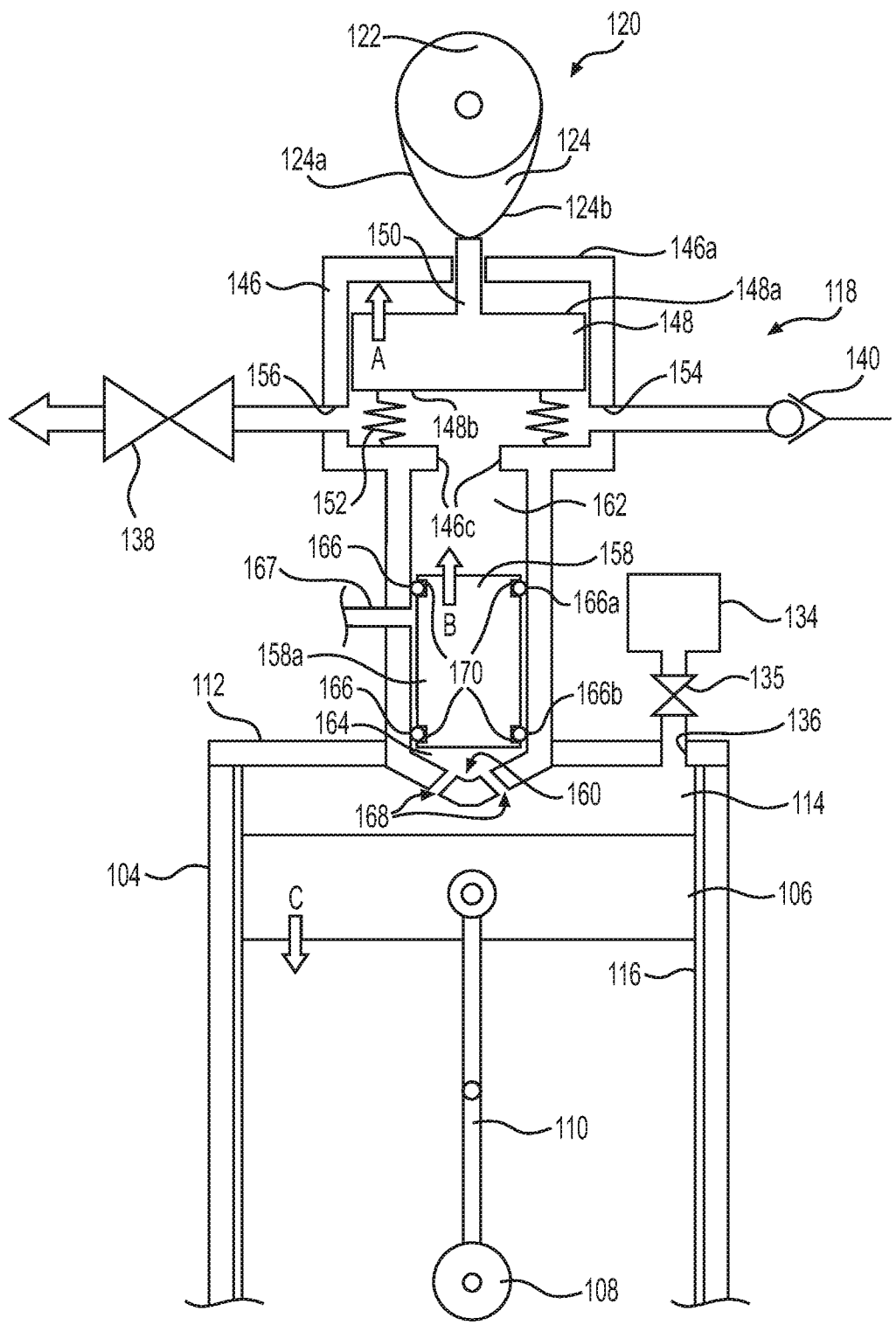
FIG. 3 is a schematic diagram of the ignition apparatus of FIG. 2 during a start of one of a power stroke or a suction stroke of the natural gas engine.
Figure 4:
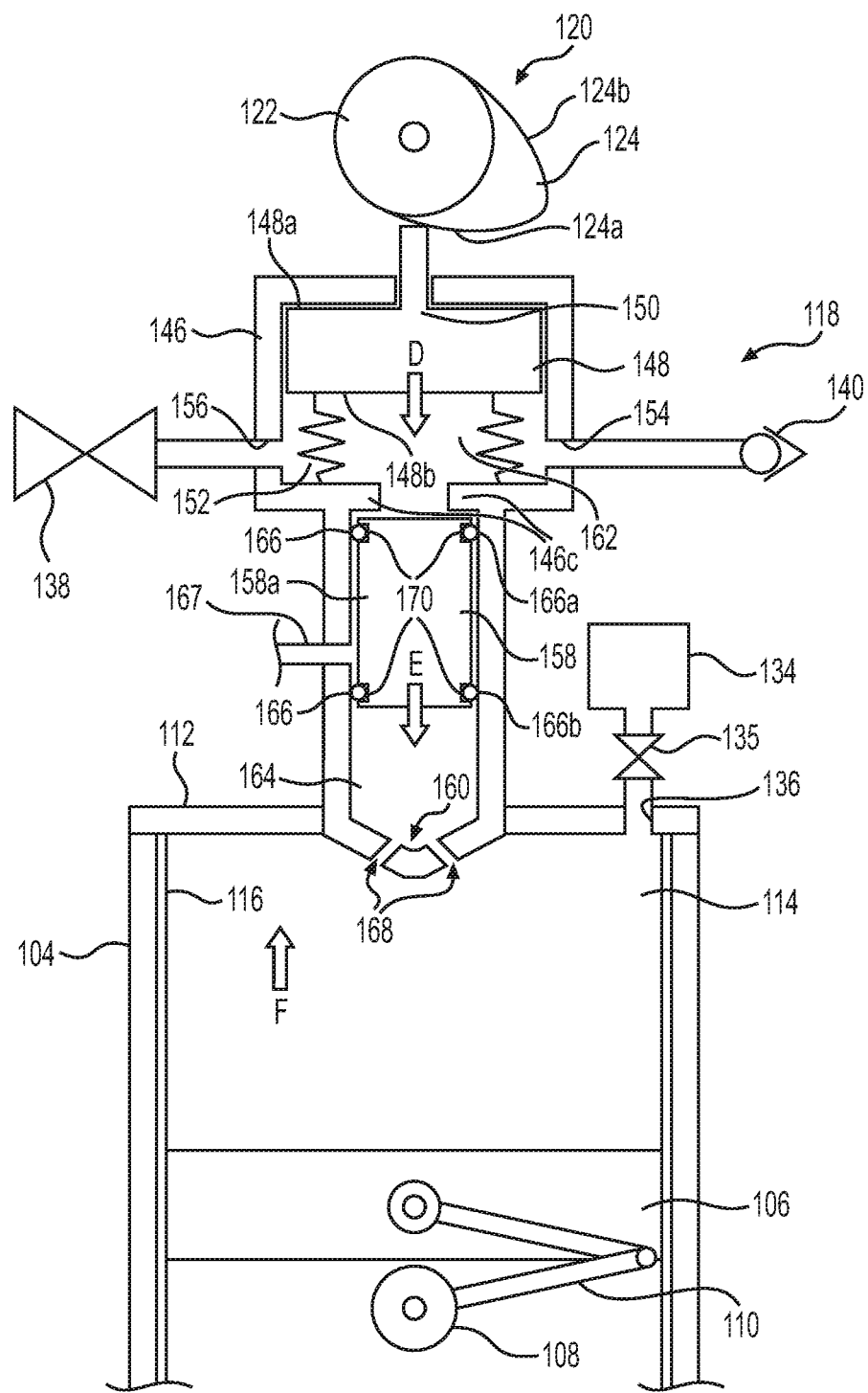
FIG. 4 is a schematic diagram of the ignition apparatus of FIG. 2 during a start of a compression stroke or an exhaust stroke of the natural gas engine.

One or more seals 166 may be provided around a circumferential surface 158a of the floating piston 158 to ensure that the hydraulic fluid is contained in the hydraulic fluid chamber 162, and the air-fuel mixture is contained in the ignition chamber 164, i.e., the hydraulic fluid and the air-fuel mixture are kept separated. In the embodiment shown in FIG. 2, for example, a gas/oil seal 166a is provided adjacent to the hydraulic fluid chamber 162, and a gas seal 166b is provided adjacent to the ignition chamber 164. These seals 166 may be low friction seals to allow for free movement of the floating piston 158. In addition, the seals 166 may sit in grooves 170 provided on the circumferential surface 158a of the floating piston 158, as shown in FIGS. 2-4, and are configured to move with movement of the floating piston 158. In this manner, the floating piston 158, with the seals 166 provided in the grooves 170, isolates the ignition chamber 164 from the hydraulic fluid chamber 162.

In addition, one or more ventilation outlets 167 are provided in a side surface of the housing 146, to allow for ventilation of any hydraulic fluid that may leak from the hydraulic fluid chamber 162 past the gas/oil seal 166a, and any air-fuel mixture that may leak from the ignition chamber 164 past the gas seal 166b, as the floating piston 158 moves between a top-dead-center (TDC) position and a bottom-dead-center (BDC) position, as described below. The leaked hydraulic fluid may be ventilated back to the hydraulic fluid supply 137, the valve 140, and/or the hydraulic fluid inlet 154. In addition, the leaked air-fuel mixture may be ventilated back to the air-fuel supply 134, the intake valve 135, and/or the air-fuel inlet 136.

The outlet 160 is formed on a bottom surface 146b of the housing 146 by a plurality of orifices 168, and may also function as an inlet. That is, the ignition chamber 164 has a common inlet and outlet 160. The plurality of orifices 168 provide fluid communication between the ignition chamber 164 and the combustion chamber 114. Put another way, the plurality of orifices 168 provide direct communication between the ignition chamber 164 and the combustion chamber 114. In this application, the term "direct communication" means uninterrupted, unobstructed communication at any time during operation of the engine. That is, the plurality of orifices 168 are not subject to closure by, for example, a valve, or other means, and are open for fluid communication at all times.

The drive piston 148 reciprocates within the hydraulic fluid chamber 162 of the housing 146 between a top-dead-center (TDC) position and a bottom-dead-center (BDC) position. The floating piston 158 reciprocates within the ignition chamber 164 between a top-dead-center (TDC) position and a bottom-dead-center (BDC) position. The BDC position of the floating piston 158 can vary based on an amount of hydraulic fluid in the hydraulic fluid chamber 162.

INDUSTRIAL APPLICABILITY

The aspects of the ignition apparatus 118 discussed herein may be used in any natural gas engine 100 to ignite an air-fuel mixture in a combustion chamber 114 of the natural gas engine 100.

During operation of the natural gas engine 100, the engine piston 106 completes four strokes, namely, a suction stroke, a compression stroke, a power stroke, and an exhaust stroke, with the cam 122 completing two rotations over the course of the four strokes of the engine piston 106. Different engine operations may have specific requirements, in terms of load and emissions, and, therefore, may require different ignition timings or fuel quantities. To that end, the controller 128 may be used to change a timing of opening and closing of one or both of the intake valve 135 and the electronically controlled valve 138, as discussed in more detail below. FIG. 3 shows relative positions of the cam 122, the drive piston 148, the floating piston 158, and the engine piston 106 at a beginning of the suction stroke, and at a beginning of the power stroke (after the cam 122 has rotated one revolution). FIG. 4 shows relative positions of the cam 122, the drive piston 148, the floating piston 158, and the engine piston 106 at a beginning of the compression stroke, and at a beginning of the exhaust stroke (after the cam 122 has rotated one revolution).

At a beginning of the suction stroke, as shown in FIG. 3, and during a first rotation of the cam 122, the drive piston 148 is located at the BDC position, the floating piston 158 is located at the BDC position, and the engine piston 106 is located at the TDC position. At this timing, a peak of the lobe 124 of the cam 122 contacts the pushrod 150 of the drive piston 148. During the suction stroke, the electronically controlled valve 138 remains closed to lock the hydraulic fluid in the hydraulic fluid chamber 162. Also during the suction stroke, the drive piston 148 moves in the direction of arrow A, the floating piston 158 moves in the direction of arrow B, and the engine piston 106 moves in the direction of arrow C. More specifically, the drive piston 148 moves from the BDC position to the TDC position due to the force of the at least one spring 152; the floating piston 158 moves from the BDC position to the TDC position due to a suction/coupling force of the hydraulic fluid as the drive piston 148 moves to the TDC position; and the engine piston 106 moves from the TDC position to the BDC position. The intake valve 135 is open during the suction stroke, so that air-fuel mixture from the air-fuel mixture supply 134 fills the combustion chamber 114 and fills ignition chamber 164 (via orifices 168). The relative positions of the lobe 124 of the cam 122, the drive piston 148, the floating piston 158, and the engine piston 106 at the end of the suction stroke are those shown in FIG. 4, at which point the engine 100 begins a compression stroke.

Next, with reference to FIG. 4, at a beginning of the compression stroke, during the first rotation of the cam 122, the drive piston 148 is in the TDC position, the floating piston 158 is in the TDC position, and the engine piston 106 is in the BDC position. At this timing, the upstream surface 124a of the lobe 124 of the cam 122 begins to pass and push down on the pushrod 150 of the drive piston 148. During the compression stroke, the electronically controlled valve 138 may be controlled by controller 128 to open for a period of time, subject to a desired ignition timing dictated by the controller 128, to allow the hydraulic fluid to flow from the hydraulic fluid chamber 162 to the hydraulic fluid container 142. At some point during the compression stroke, however, the electronically controlled valve 138 is closed to lock the hydraulic fluid in the hydraulic fluid chamber 162. Also during the compression stroke, the drive piston 148 moves in the direction of arrow D, the floating piston 158 moves in the direction of arrow E, and the engine piston 106 moves in the direction of arrow F. More specifically, the drive piston 148 moves from the TDC position to the BDC position due to a force of the lobe 124 of the cam 120, and forces the hydraulic fluid downward toward the floating piston 158. The floating piston 158 moves from the TDC position toward the BDC position as a function of the fluid link in the hydraulic fluid chamber 162 between the drive piston 148 and the floating piston 158; and the engine piston 106 moves from the BDC position toward the TDC position by movement of the crankshaft 108 and the connecting rod 110. Thus, reciprocation of the engine piston 106 is based on a rotational position of the crankshaft 108. By the end of the compression stroke, the relative positions of the lobe 124 of the cam 122, the drive piston 148, the floating piston 158, and the engine piston 106 are those shown in FIG. 3, and the ignition chamber 164 and the combustion chamber 114 are filled with pressurized air-fuel mixture.

Near the end of the compression stroke, a temperature of the pressurized air-fuel mixture in the ignition chamber 164 increases due to the pressure increase in the ignition chamber 164 as the floating piston 158 moves from the TDC position toward the BDC position. The temperature of the pressurized air-fuel mixture increases until it reaches an ignition temperature, for example, of greater than 600° C., and the air-fuel mixture ignites. That is, the pressurized air-fuel mixture in the ignition chamber 164 undergoes a chemical process of releasing energy by burning when the temperature reaches the ignition temperature. The ignited air-fuel mixture in the ignition chamber 164 passes through the outlet 160, in the form of the plurality of orifices 168, into the combustion chamber 114, and ignites the hot air-fuel mixture in the combustion chamber 114, causing an explosion, which marks the beginning of the power stroke.

With reference to FIG. 3, during the power stroke, when the cam 122 begins a second rotation, the drive piston 148 is located in the BDC position, the floating piston 158 is located in the BDC position, and the engine piston 106 is located in the TDC position. At this timing, a peak of the lobe 124 of the cam 122 contacts the pushrod 150 of the drive piston 148. The explosion in the combustion chamber 114 causes the engine piston 106 to rapidly move downward in the direction of the arrow C, from the TDC position to the BDC position, which, in turn, forces the connecting rod 110 to move and thereby rotate the crankshaft 108, or other output mechanism, thereby completing the power stroke of the engine 100.

In addition, during the power stroke, the cam 122 continues to rotate to permit the pushrod 150 and, therefore, the drive piston 148 to move upward in the direction of arrow A, by the force of the at least one spring 152, from the BDC position to the TDC position. The electronically controlled valve 138 remains closed, and the hydraulic fluid in the hydraulic fluid chamber 162 generates a fluid link connecting the drive piston 148 and the floating piston 158 to move the floating piston 158 upward in the direction of the arrow B, from the BDC position to the TDC position. The floating piston 158 reaches the TDC position and abuts against the two protrusions 146c of the housing 146. As the drive piston 148 continues to move toward the TDC position, and after the floating piston 158 has reached the TDC position, a pressure differential is generated, causing the one-way inlet check valve 140 to open, allowing hydraulic fluid from the hydraulic fluid supply 137 to flow into the hydraulic fluid chamber 162. In this way, the hydraulic fluid chamber 162 is recharged, i.e., a volume of the hydraulic fluid is restored to an initial amount, at each instance in which the drive piston 148 and the floating piston 158 move to the TDC positions, respectively. By the end of the power stroke, the relative positions of the lobe 124 of the cam 122, the drive piston 148, the floating piston 158, and the engine piston 106 are those shown in FIG. 4, at which point the engine 100 begins the exhaust stroke.

Finally, with reference again to FIG. 4, at a beginning of the exhaust stroke, during the second rotation of the cam 122, the drive piston 148 is in the TDC position, the floating piston is in the TDC position, and the engine piston 106 is in the BDC position. At this timing, the upstream surface 124a of the lobe 124 of the cam 122 begins to pass and push down on the pushrod 150 of the drive piston 148. During the exhaust stroke, the electronically controlled valve 138 remains closed to lock the hydraulic fluid in the hydraulic fluid chamber 162. As the drive piston 148 moves downward in the direction of the arrow D from the TDC position to the BDC position, in response to the force of the lobe 124, the drive piston 148 forces the hydraulic fluid downward, which, in turn, moves the floating piston 158 in the direction of the arrow E, from the TDC position to the BDC position. As the floating piston 158 moves downward, combustion gases from the ignition of the air-fuel mixture in the ignition chamber 164 are forced downward through the outlet 160, via the plurality of orifices 168, into the combustion chamber 114. In addition, the engine piston 106 moves from the BDC position to the TDC position by movement of the crankshaft 108 and the connecting rod 110, and forces exhaust gas from the combustion in the combustion chamber 114 and the exhaust gas from the ignition chamber through an exhaust port (not shown) of the combustion chamber 114. By the end of the exhaust stroke, the relative positions of the lobe 124 of the cam 122, the drive piston 148, the floating piston, and the engine piston 106 are those shown in FIG. 3. At this point, the engine 100 has completed one cycle of four piston strokes, and returns to the beginning of the suction stroke, discussed above, to begin another cycle.

As noted above, opening and closing of the electronically controlled valve 138 may be controlled to adjust a timing of combustion. In particular, opening and closing of the electronically controlled valve 138 may be controlled by the controller 128 to adjust the amount of hydraulic fluid in hydraulic fluid chamber 162, and thus the movement of floating piston 158 and the timing of the combustion of the fuel-air mixture in the combustion chamber 114. Adjustment of opening and closing of the electronically controlled valve 138, i.e., an open time and a close time, may be based on a desired engine load (via an engine load map) and/or other engine requirements or restrictions (e.g., emissions restrictions). Further, such valve control may take into account one or more sensor signals from the engine 100, such as a pressure signal from a cylinder 104, or an exhaust gas temperature as measured by the exhaust gas temperature sensor 144a. Of course, the adjustment of the open time and close time of the electronically controlled valve 138 may be modified for any other reason. Such an adjustment may be needed if, for example, a power imbalance occurs between the cylinders 104 of the engine 100, or based on a temperature of the engine, such as a temperature measured by the IMAT sensor 144b, when the engine 100 is started, i.e., when a cold start or an idle start of the engine 100 occurs. For example, if the temperature measured by the IMAT sensor 144b is relative low, the electronically controlled valve 138 may not be opened at the beginning of the compression stroke, i.e., at 0 seconds. This results in a relatively long compression stroke of the engine 100, i.e., the amount of time during which the air-fuel mixture in the ignition chamber 164 is compressed is increased. On the other hand, if the temperature of the engine 100 measured by the IMAT sensor 144b is relatively high, the electronically controlled valve 138 may be opened during a portion of the movement of the drive piston 148, in order to shorten the compression stroke, i.e., the amount of time during which the air-fuel mixture in the ignition chamber 164 is compressed is decreased.

By virtue of the engine ignition apparatus and the related method of the present disclosure, it is possible to replace a spark plug having a limited use life. In addition, the engine ignition apparatus and related method of the present disclosure provide for direct communication between an ignition chamber and a combustion chamber, thereby facilitating the flow of gases in and out of the ignition chamber. Further, the engine ignition apparatus and related method of this disclosure provide a controllable hydraulic fluid chamber and electronically controlled valve that facilitate varied timing of ignition.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An engine ignition apparatus for a natural gas engine, comprising:
   a housing including:
      a drive piston;
      a floating piston;
      a controllable hydraulic fluid chamber located between the drive piston and the floating piston; and
      an ignition chamber acted on by the floating piston, the ignition chamber having an outlet formed by a plurality of orifices, the outlet being in direct communication with a combustion chamber of the engine.

2. The engine ignition apparatus of claim 1, wherein the floating piston isolates the ignition chamber from the hydraulic fluid chamber.

3. The engine ignition apparatus of claim 1, wherein the plurality of orifices also form an inlet to the ignition chamber.

4. The engine ignition apparatus of claim 1, further comprising a valve connected to the hydraulic fluid chamber, and configured to open and release a hydraulic fluid from the hydraulic fluid chamber, and to close.

5. The engine ignition apparatus of claim 4, further comprising a controller configured to control opening and closing of the valve.

6. The engine ignition apparatus of claim 5, wherein the controller opens the valve at an opening timing, and closes the valve at a closing timing, based at least in part on a desired engine load.

7. The engine ignition apparatus of claim 5, wherein the controller opens the valve at an opening timing, and closes the valve at a closing time, based on an engine requirement, including one or more of a pressure signal, or an exhaust gas temperature signal from the natural gas engine.

8. An engine ignition apparatus for a natural gas engine, comprising:
   a housing including:
      a drive piston;
      a floating piston;
      a controllable hydraulic fluid chamber located between the drive piston and the floating piston;
      a controllable valve connected to the hydraulic fluid chamber, and configured to open and release a hydraulic fluid from the hydraulic fluid chamber, and to close; and
      an ignition chamber acted on by the floating piston, the ignition chamber having an and outlet.

9. The engine ignition apparatus of claim 8, wherein the floating piston isolates the ignition chamber from the hydraulic fluid chamber.

10. The engine ignition apparatus of claim 8, wherein the common inlet and outlet of the ignition chamber is formed by a plurality of orifices.

11. The engine ignition apparatus of claim 8, further comprising a controller configured to control opening and closing of the controllable valve.

12. The engine ignition apparatus of claim 11, wherein the controller controls an ignition timing of the engine by controlling the opening and the closing of the controllable valve.

13. The engine ignition apparatus of claim 11, wherein the controller opens the controllable valve at an opening timing, and closes the valve at a closing timing, based on an engine load map.

14. The engine ignition apparatus of claim 11, wherein the controller opens the controllable valve at an opening timing, and closes the valve at a closing time, based on an engine requirement, including one or more of a pressure signal, or an exhaust gas temperature signal from the engine.

* * * * *